Feb. 25, 1969  G. D. HALL ETAL  3,430,084
ELECTRIC MOTOR AND BRUSH ASSEMBLY FOR A PORTABLE TOOL
Filed July 6, 1966  Sheet 1 of 2
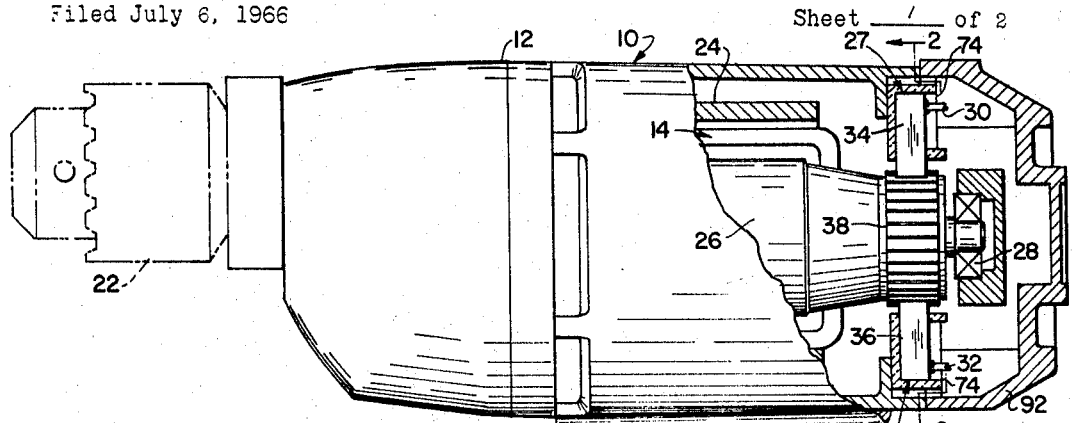
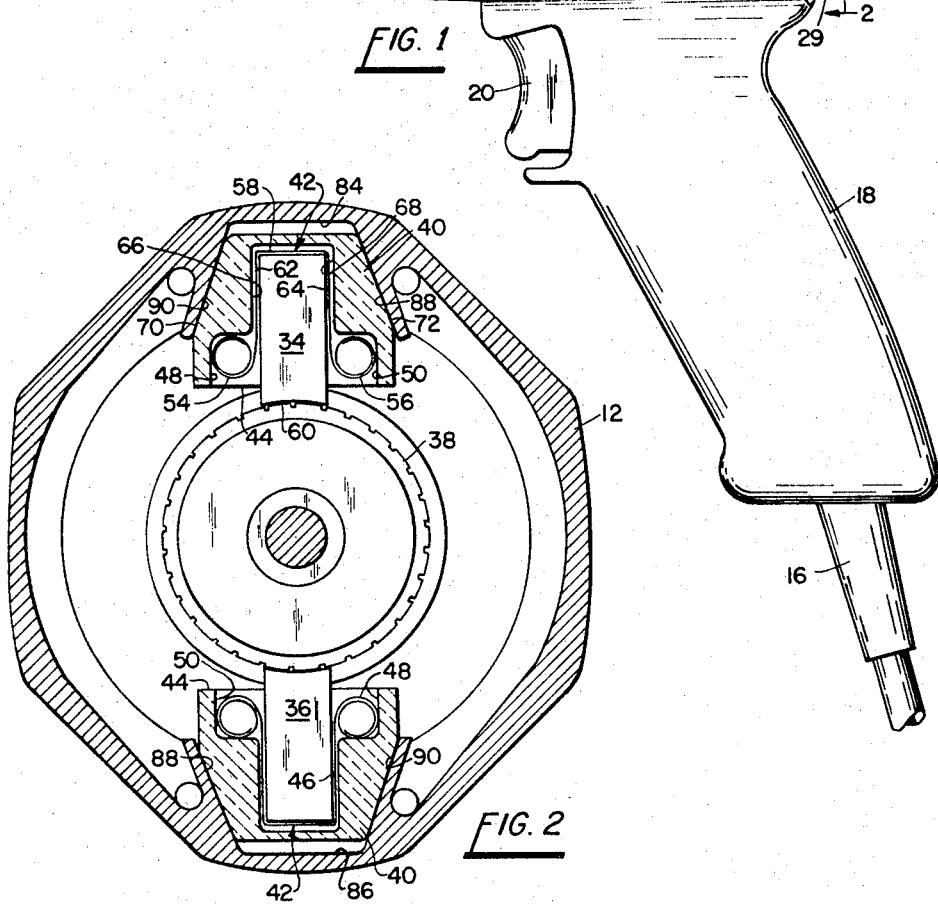
INVENTOR
GEORGE D. HALL
ROBERT H. HUBER
ROBERT W. WAGNER
BY
Strauch, Nolan, Neale, Nies & Bronaugh
ATTORNEYS

INVENTOR
GEORGE D. HALL
ROBERT H. HUBER
ROBERT W. WAGNER

BY *Strauch, Nolan, Neale, Nies & Bronaugh*
ATTORNEYS

United States Patent Office 3,430,084
Patented Feb. 25, 1969

3,430,084
ELECTRIC MOTOR AND BRUSH ASSEMBLY
FOR A PORTABLE TOOL
George D. Hall, Verona, and Robert H. Huber, Pittsburgh, Pa., and Robert W. Wagner, Jackson, Tenn., assignors to Rockwell Manufacturing Company, Pittsburgh, Pa., a corporation of Pennsylvania
Filed July 6, 1966, Ser. No. 563,204
U.S. Cl. 310—50          18 Claims
Int. Cl. H02k 7/14

ABSTRACT OF THE DISCLOSURE

An electric motor and brush mounting structure for a portable tool having a brush holder with convergent seating surfaces fitting into a complementary convergent recess in an electric motor housing in a portable power tool. Within the brush holder a stepped recess receives two spaced apart coils of a constant force spring, the two coiled portions being joined by a bridging spring strip which embraces the rear end of a brush. The rear end of the brush, in abutment with and carrying the bridging portion of the spring with it, is forced into a recess in the brush holder whereupon the constant force spring coils provide a balanced force biasing the brush toward the motor commutator.

---

This invention pertains to portable power tools and the like and more particularly to an improved mounting construction for the brushes of the electric motor thereof.

Various motor brush mounting constructions for portable power tools and like applications are known in the prior art which cooperate with the rotatable commutators, either through radial or axial contact therewith. Generally in such prior brush mounting constructions, the brushes or brush holders require accurate circumferential alignment with respect to commutator segments for maximum electrical effect, and such alignment is accomplished either by precise manufacturing of brush holders, and brush holder seats or by relative manipulative adjustments where the fastening for the brush holder is designed to permit this. Examples of prior art constructions on which this invention constitutes an improvement will be found in the patents to Summerfield No. 3,108,201, of Oct. 22, 1963, for "Brush Holder Assembly"; in Sievert No. 3,025,421 of Mar. 13, 1962, for "Brush Mounting for Small Commutator Type Motors"; and in Welch et al., No. 2,695,968 of Nov. 30, 1954, for "Commutator With Constant Tension Spring."

In contrast to such prior art, this invention is directed to an improved brush mounting structure which is self-aligning, and which permits rapid and ready installation with respect to the commutator. More specifically, this invention utilizes wedge shaped motor brush holders adapted to be received in a complementally wedge shaped seat formed within the motor casing in axial alignment with and extending radially outwardly from the motor commutator. A single spring mounted within the holder is utilized to exert axial bias on the brush within the holder and also to cause seating alignment of the holder within the seat therefor. No separate attaching or retaining means for the brush holder are required.

The present invention in its preferred form utilizes a constant force or noncumulative force type spring. The utilization of these springs to provide a constant force biasing commutator brushes radially inwardly toward the commutator surface is illustrated in the aforesaid Sievert and Welch et al. patents and is described in detail in a bulletin No. 310P entitled, "Preliminary Design Data Brush Holder Springs," copyright 1961 by American Machine and Metals Inc. of Lansdale, Pa. These springs are there said to be manufactured under U.S. Patents Nos. 2,609,191 issued Sept. 2, 1952, to E. E. Foster for "Spring Counterbalance," 2,609,192 issued Sept. 2, 1952, to B. Lermont for "Coil Spring and Coil Spring Assembly Including the Support for Such Springs," U.S. Patent No. 2,609,193 issued Sept. 2, 1952, to E. E. Foster for "Spring Sash Counterbalance," and U.S. Patent No. 2,801,669 issued Aug. 6, 1957, to B. Lermont for "Apparatus for Coiling Spring Material." Reference is made to said patents and said publication for any details as to the structure and characteristics of said springs.

As is apparent from reference to the aforesaid Sievert and Welch et al. patents, the commutator brush mounting constructions utilizing springs of this type have been complex, not unitized in construction and therefore difficult to install and remove rendering initial assembly and repair expensive and time consuming.

Unitized commutator brush-spring-holder subassemblies have been utilized in the past for other types of springs as is indicated by the aforesaid Summerfield patent. Such assemblies have utilized conventional coil type springs located at the end thereof remote from the arcuate commutator engaging surfaces of the brush. As a result the holder must be sufficiently large to accommodate the length of the brush plus the length of the collapsed height of the coil spring. Accordingly these prior art unitized constructions have had excessive length requiring excessive size of the motor casing with resultant increase in cost of the motor casing material.

In addition, the prior art unitized constructions for commutator brush-spring-holder subassemblies have required individual adjustment and locking in position of the subassemblies upon installation. This is disadvantageous in that it is time consuming in initial assembly and in brush replacement and in that perfect radial alignment of the brush with the axis of the commutator cannot be achieved.

Commutator brushes, as formed, have an arcuate end face or surface intended to seat in perfect arcuate surface to surface contact with the surface of the commutator. If, in assembly, the center of curvature of the brush surface is not coaxial with the commutator axis, there will be, initially, only line contact between the brush and commutator, thus providing a high resistance connection. The brush will, of course, gradually wear until it seats perfectly but the initial misalignment decreases the brush life due to the higher initial brush to commutator engaging pressure with resultant increased wear.

In the prior unitized brush holder subassemblies, the position of the subassemblies circumferentially of the commutator is established by manual adjustment of a screw acting against one side face of the holder to clamp it against a surface of the motor casing. The location of the center of curvature of the brush arc with respect to the commutator axis in such constructions is thus dependent upon variations in the position of the surface of the motor casing with respect to the surfaces thereon which locate the armature bearings, variations in tolerances in the width of the brush holder and variations in the degree to which the brush holder clamping screw is tightened. Since the brush holder has to be formed of suitable dielectric or insulating material, it is subject to distortion or even breakage if subjected to excessive pressure by excessive tightening of the clamping screw.

In addition, when these structures are embodied in portable power tools such as drills and the like which are subjected to vibration in operation and shock vibrations in handling and storage, these clamping screws may become loosened or even come out with resultant injury to the motor either through mechanical engagement with the moving parts while the tool is in operation or through the creation of electrical short circuits.

The present invention overcomes all of these disadvantages of the prior art constructions by providing a brush-holder-biasing spring subassembly which is compact in construction and which is installed in operative position merely by insertion into a socket in the casing disposed in alignment with the commutator, the brush holder and casing having self-aligning surfaces by which the brush and its holder are maintained resiliently in proper alignment through the action of the brush biasing spring.

It is, therefore, the basic object of the present invention to provide, in a portable electric power tool or the like an improved self-aligning, space saving brush mounting and holding construction eliminating the foregoing difficulties.

A further object of the present invention is to provide an improved electric motor construction in which the commutator brushes together with their biasing springs and their attached flexible conductors are arranged as a unitized circumferentially self-aligning subassembly which may be installed in the motor casing in proper alignment with the commutator merely by being inserted into a complementary socket disposed in the motor casing structure radially outwardly of the motor commutator.

These and other objects of the present invention will become more fully apparent by reference to the appended claims and as the following detailed description proceeds in connection with the drawings, wherein:

FIGURE 1 is a partly sectioned elevation of a portable electric drill embodying the present invention;

FIGURE 2 is a transverse sectional view of the FIGURE 1 embodiment along line 2—2 of section 1;

Figure 7:
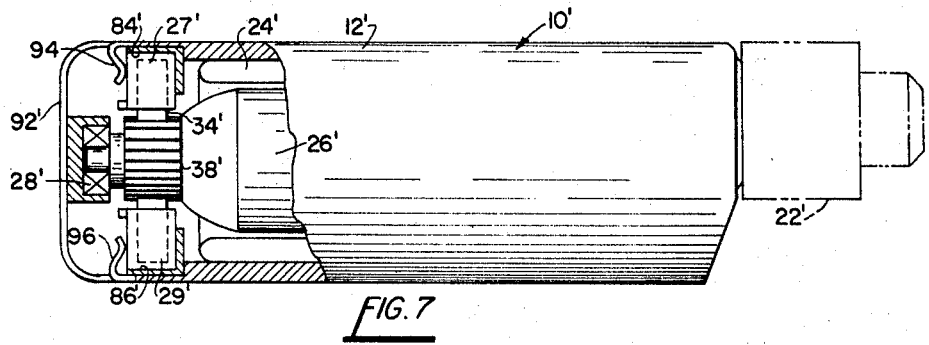
FIGURE 7 is a partly sectioned elevation of another type of electric drill embodying the invention.

Referring now in detail to the drawings and particularly to FIGURE 1, there is there illustrated, as typical of the portable electric power tools in which the principles of the present invention may be embodied, an electric drill 10 having a casing 12 in the interior of which is located an electric motor 14 to which power is supplied through an input cable 16 through a hand grip handle 18 under control of a switch (not shown) actuated by a trigger 20. Through suitable reduction gearing, the motor 14 drives a tool supporting power output element such as a chuck 22.

The motor 14 is of the commutator type and consists essentially of a field winding 24 mounted in fixed relation within the casing 12 and an armature 26 journalled in the casing 12 by spaced aligned bearings one of which is illustrated and indicated at 28.

Electrical connection is made to the armature through subassemblies 27 and 29 (comprising respectively the input lead wires 30 and 32 and the carbon brushes 34 and 36 in which one of the ends of the lead wires 30 and 32 respectively are embedded) and the commutator 38.

As is most clearly apparent from FIGURE 2, the unitized subassemblies 27 and 29 of which brushes 34 and 36 each form a component, consist of a brush 34 or 36, a brush holder 40, a brush biasing spring 42 is a ribbon type constant force elastic member.

Figure 3:
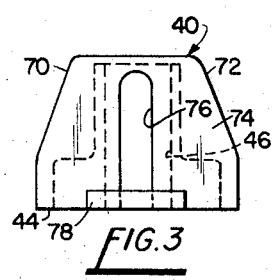
FIGURE 3 is an elevation of the brush holder.
Figure 6:
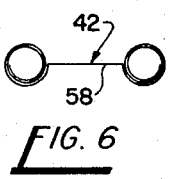
FIGURE 6 is a side elevational view of the brush biasing spring in its relaxed configuration.
Figure 4:
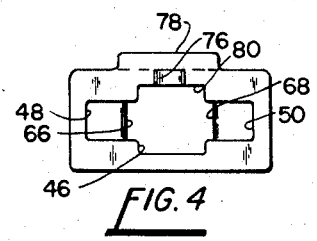
FIGURE 4 is a bottom view thereof.

The construction of the brush holder 40 is best illustrated in FIGURES 3 and 4. In a preferred form it is a molded part formed by fiber glass reinforced polycarbonate (40% polycarbafil). Other materials have also been found suitable, among them phenolic resins and glass-filled nylon. From its end 44, which in assembly as in FIGURE 2 is adjacent the commutator 38, it has an elongated aperture or recess 46 formed therein which is of rectangular cross-section (see FIGURE 4) and coacts with the planar side walls of the brush 34 or 36 received therein to guide the brush for rectilinear motion. The brush holder 40 is formed with side recesses 48 and 50 (FIGURES 2 and 4) at each side of the central brush receiving recess 46. The side recesses 48 and 50 receive the undeflected or unstressed portions of the opposite convoluted ends 54 and 56 of the spring 42. The central unconvoluted portion 58 of the spring 42 straddles the end of the brush 34 opposite its arcuate commutator engaging face 60, the stressed or deformed portions 62 and 64 of the convoluted end portions of the spring 42 extending along the opposite sides of the brush 34 in guide channels 66 and 68 (FIGURE 4). The relaxed configuration of spring 42 is shown in FIGURE 6.

The end of the holder 40 opposite end face 44 is of wedge shape configuration, there being side faces 70 and 72 which are arranged in symmetrical converging relation with respect to the centerline of the aperture 46 defining the rectilinear path of motion of the brush within the brush holder 40. In the preferred form the surfaces 70 and 72 are planar and the planes thereof intersect in a line parallel to the axis of curvature of the brush arcuate surface 60 or, in the final assembled unit, the axis of rotation of the commutator 38, the line of intersection of the planes of surfaces 70 and 72, lying substantially on the centerline of the path of reciprocation of the brush in the brush holder aperture 46.

Figure 5:
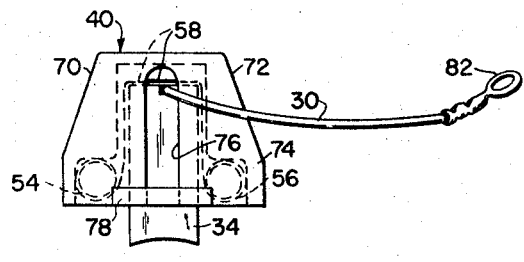
FIGURE 5 is a front elevation of the brush holder and brush assembly of this invention.

The brush holder 40 is formed on one of its faces 74 with a through aperture 76 opening into the central recess 46. This aperture 76, as is apparent from FIGURES 3 and 4, is closed at the end thereof adjacent face 44 by an offset projection 78 thereby providing a space between the projection 78 and the surface 80 of the aperture 46 through which the lead wire 30 or 32 (see FIGURE 5) and its end terminal 82 can pass during insertion of the brush 34 and 36 into the recess 46 to form the subassembly illustrated in FIGURE 5. As is apparent from FIGURE 5, as the brush 34 is inserted into the recess, the lead wire 30 and its terminal 82 are allowed to pass through the side wall aperture 76 of the brush holder 40. With the lead wire 30 turned at right angles to the face of the brush 34 in which it is embedded, it is effective to engage the projection 78 and prevent movement of the brush 34 completely out of the recess 46 under the biasing influence of the spring 42 thereby assuring that the holder 40, the spring 42 and the brush 34 or 36 will be retained in subassembled relation. This feature is especially useful as the brush 34 wears. Projection 78 prevents brush 34 from completely wearing away and allowing the spring 42 to fall out of the holder 40, and also prevents wire 30 from contacting commutator 38. Another benefit gained from an aperture 76 is the ease of inspection of brushes 34 and 36. The length of these brushes can be observed visually through the end of the tool, either by suitable inspection openings (not shown) or by removal of end cover 92, but in any event without disassembly of the tool. This would enable a check on the condition of the brushes to be made relatively frequently.

Referring again to FIGURE 2, it is there apparent, these subassemblies are inserted into diametrically opposed sockets 84 and 86 formed in the casing 12. These sockets 84 and 86 are each formed with side walls 88 and 90 which are convergent inwardly of the socket and are disposed in symmetrically converging relation with respect to a plane passing through the axis of rotation of the commutator 38 and through the center of the sockets. The sockets 84 and 86 are thus complementary in form to the wedge shaped end of the brush holder 40 to thereby coact with the surfaces 70 and 72 on the brush holder 40 to establish self-alignment of the brushes 34 and 36 with respect to the axis of rotation of the commutator 38.

These sockets 84 and 86 are open at their sides adjacent the bearing 28 (see FIGURE 1) so that the subassemblies may be inserted therein axially of the motor 14 while the brushes 34 and 36 are manually retained fully within the recesses 46 of the brush holder 40 and, upon release of the brushes, the springs are effective to bias the holder 40 into the socket 84 or 86 and the brush 34 or 36 against the periphery of the commutator 38. No adjustment of the brushes 34 or 36 circumferentially of the commutator 38 is required. Should the holder 40 be displaced slightly in use due to vibration of the tool or rough handling of the tool, it will be automatically reseated under the biasing force of the spring 42 and the proper seating of the brushes 34 and 36 upon the commutator 38 immediately restored.

Referring again to FIGURE 1, an end cap 92 for the casing 12, is fixed to the end of the casing 12 around the bearing 28. This end cap 92 has faces which abut the surface 74 of the brush holders 40 to retain them within the sockets 84 and 86 axially of the motor 14.

Figure 8:
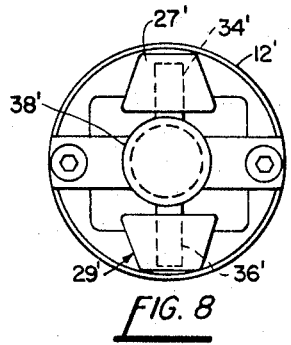
FIGURE 8 is an end view of the embodiment of the invention shown in FIGURE 7 looking from the left of FIGURE 2 with end cap removed.

The second embodiment of this invention is illustrated in FIGURES 7 and 8. In this embodiment the brush-holder-spring subassemblies are identical with that illustrated in FIGURE 5 and described heretofore in reference to the first embodiment. This second embodiment illustrates the manner in which the present invention facilitates the design of extremely small motor units for very compact hand tools.

This embodiment is also a drill 10′ having a casing 12′ supporting a motor field winding 24′ within which is journalled a motor armature 26′ having a commutator 38′ at one end thereof and journalled by a bearing 28′ at one end. The brush-holder-spring subassemblies 27′ and 29′ are seated within the sockets 84′ and 86′ being axially retained therein by spring clips 94 and 96 formed on the end cap 92′. By reference to FIGURE 8 in particular, it is apparent that the diameter of the casing 12′ very closely approaches in length the sum of the diameter of the commutator 38′ and the length of the two brushes 34′ and 36′ at the time they are initially installed, that is, prior to material wear. The internal diameter of the casing 12′ at the region in which the subassemblies 27′ and 29′ are located exceeds the sum of the diameter of the commutator 38′ and the length of the brushes 34′ and 36′ essentially only by the thickness of the central portion of the spring between the convoluted ends which rests on the end of the brushes 34′ and 36′ and the thickness of the end wall of the recess in which the brushes 34′ and 36′ are received. As a result of this construction, it is possible to build an operative hand drill which can be conveniently held in the palm of one's hand, a construction which was not possible with such prior art unitized brush-holder-spring subassembly mounting constructions as that shown by Summerfield.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In combination with a commutator type electric motor for portable electric power tools and the like having a casing, a field in said casing, and an armature journalled on said casing within said field for rotation about a predetermined axis and including a commutator coaxial therewith; a commutator brush-holder-spring subassembly, the brush of said subassembly having an arcuate surface at one end the radius of curvature of which is substantially equal to that of said commutator, the holder of said subassembly having a recess opening through one end to receive the brush of said subassembly, said holder recess and brush having coacting complementary brush guide surfaces thereon mounting and guiding said brush for substantially rectilinear movement radially of said brush arcuate surface, said spring being interposed between said holder and said brush to bias said brush toward the center of curvature of said arcuate surface, and coacting means on said casing in radially outwardly spaced relation to said commutator and on the other end of said holder of said subassembly operative to mount said subassembly upon said casing with the brush thereof disposed radially of and resiliently biased against said commutator, said means establishing alignment of the center of curvature of said arcuate surface of said brush with the commutator axis.

2. The combination defined in claim 1 wherein said holder recess has side walls constituting said brush guide surfaces on said holder.

3. The combination defined in claim 2 wherein said other end of said holder is wedge shape, said self-aligning means comprises a pair of surfaces on said holder other end which pair of surfaces are symmetrically divergent from the path of rectilinear movement of said brush relative to said holder and a socket on said casing complementary in form to said holder other end and opening radially inwardly toward the center of said commutator.

4. The combination defined in claim 3 wherein said symmetrically divergent holder surfaces are planar and positioned so that the intersection of the planes thereof is a line parallel to the axis defining the center of curvature of said brush arcuate surface.

5. The combination defined in claim 2 wherein said spring is a ribbon type constant force elastic member.

6. The combination defined in claim 5 wherein said elastic member is located within said holder recess and comprises a central saddle portion bearing upon the end of said brush opposite to said arcuate surface and convoluted end portions disposed on opposite sides of said brush.

7. The combination defined in claim 6 wherein said holder has side recesses at said one end thereof at opposite sides of the path of movement of said brush to receive and retain the unstressed portions of said spring end convolutions.

8. The combination defined in claim 7 wherein said holder has spring guide channels extending along the walls of said recess beside said brush to receive and guide the stressed portions of said spring end convolutions.

9. The combination defined in claim 6 wherein said brush holder has an elongated aperture through one side wall thereof opening into said holder recess and the path of movement of the brush therein and wherein said brush has attached to a side thereof a flexible connector wire extending through said aperture and operative to engage the end of said aperture at said one end of said holder to retain said brush in said recess in opposition to the biasing force of said spring to thereby prevent disassembly thereof.

10. In combination, an electric motor having a casing, a field in said casing, an armature mounted for rotation on said casing within the field and including a commutator and a plurality of elongated carbon brushes mounted on said casing in symmetrical circumferentially spaced relation about the commutator and in electrical sliding contact with the periphery of said commutator, the mounting for each of said brushes comprising means fixed relative to said casing defining a brush holder receiving recess which, circumferentially of said commutator, is symmetrically convergent radially outwardly with respect to a predetermined radius through the rotation axis of the commutator, a holder for said brush formed of insulating material and having an axially elongated brush receiving recess formed therein from one end thereof and extending substantially the entire length thereof, said holder having side recesses therein at each side of said brush receiving recess adjacent said one end, a constant force spring having end convolutions seated in each of said side recesses and a saddle portion bridging said brush receiving recess, said holder at its opposite end being complementary in form to and interfitting in self-aligning relation with said convergent recess, the brush mounted in said recess of said holder engaging at one end said saddle portion of said constant force spring and engaging at the other end said commutator whereby said holder is resiliently biased by said spring into said recess and brush is resiliently biased into electrical sliding contact with the periphery of said commutator.

11. In a brush assembly for an electric motor or the like, a brush holder having planar external side walls and an end wall, at least an opposed pair of said side walls thereof sloping symmetrically towards the end closure to form a generally frusto-pyramidal formation, and a keyed internal guideway defining recess open at the end opposite said end wall and extending substantially centrally of said holder to receive a brush therein.

12. A brush assembly according to claim 11 wherein said holder is rectangular in cross-section in planes perpendicular to the centerline axis of said guideway and wherein said guideway is of substantially rectangular cross-section.

13. In a brush assembly according to claim 12, a central slot in one of the parallel walls providing access to the keyed guideway, said slot extending substantially along the entire height of the wall, and a narrow crosspiece integral with the slotted wall adjoining the bottom of the slot, and in a plane adjacent that of said slot.

14. A brush assembly according to claim 13 wherein a carbon brush and a flat, saddle type, constant tension, biasing spring having coiled end portions are carried by said holder, there being hollow seats within said holder on opposite sides of said brush in proximity to the open end thereof for receiving said coiled end portions of said spring.

15. A brush assembly according to claim 14 wherein said brush has an imbedded pigtail at one end thereof, said pigtail passing thorugh the slot in said parallel wall to permit longitudinal movement of the brush, and serving to prevent separation of the brush from the holder by engagement with said crosspiece.

16. A brush assembly according to claim 11 wherein a carbon brush and a flat, saddle type constant tension, biasing spring having coiled end portions are carried by said holder, there being hollow seats within said holder on opposite sides of said brush in proximity to the open end thereof for receiving said coiled end portions of said spring.

17. A brush assembly according to claim 14 wherein said constant tension spring is narrower than the sides and top of the brush with which it cooperates and wherein grooves are provided in said holder recess parallel to the brush guideway for accommodating said spring.

18. In an electrically driven hand tool utilizing a small electric motor and a compact enclosing case, a brush and commutator assembly comprising concave seats formed in the case in a plane of the commutator, brush holders of convex configuration at one end matching said seats and non-rotatably mounted in said seats in self-centering relation, a brush non-rotatably and axially slidably mounted within each brush holder and a constant tension spring mounted within each holder so as to saddle the end of the brush in such holder remote from said commutator to bias it against the commutator, said brushes being initially of such length as to occupy substantially the entire space between the interior of the case and the face of the commutator, along a diametral line through the axis of said commutator.

References Cited

UNITED STATES PATENTS

| 2,179,279 | 11/1939 | Brecht | 310—245 |
| 2,695,968 | 11/1954 | Welch et al. | 310—246 |
| 2,848,633 | 8/1958 | Atamian | 310—245 |
| 3,025,421 | 3/1962 | Sievert | 310—245 |

WARREN E. RAY, *Primary Examiner.*

U.S. Cl. X.R.

310—242, 247

UNITED STATES PATENT OFFICE
CERTIFICATE OF CORRECTION

Patent No. 3,430,084                                  February 25, 1969

George D. Hall et al.

It is certified that error appears in the above identified patent and that said Letters Patent are hereby corrected as shown below:

Column 3, line 69, after "spring 42" insert -- and an input lead wire 30 or 32. The brush biasing spring 42 --.

Signed and sealed this 31st day of March 1970.

(SEAL)
Attest:

Edward M. Fletcher, Jr.
Attesting Officer

WILLIAM E. SCHUYLER, JR.
Commissioner of Patents